United States Patent
Hagiwara et al.

(10) Patent No.: US 10,535,452 B2
(45) Date of Patent: Jan. 14, 2020

(54) PERMANENT MAGNET, ROTARY ELECTRIC MACHINE, AND VEHICLE

(71) Applicant: KABUSHIKI KAISHA TOSHIBA, Tokyo (JP)

(72) Inventors: Masaya Hagiwara, Kanagawa (JP); Toshihide Takahashi, Kanagawa (JP); Yosuke Horiuchi, Tokyo (JP); Shinya Sakurada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 146 days.

(21) Appl. No.: 15/910,350

(22) Filed: Mar. 2, 2018

(65) Prior Publication Data

US 2018/0190415 A1 Jul. 5, 2018

Related U.S. Application Data

(63) Continuation of application No. PCT/JP2016/004114, filed on Sep. 9, 2016.

(51) Int. Cl.
*H02K 1/02* (2006.01)
*H02K 1/27* (2006.01)
(Continued)

(52) U.S. Cl.
CPC .......... *H01F 1/0557* (2013.01); *C22C 19/07* (2013.01); *C22F 1/10* (2013.01); *H02K 1/02* (2013.01);
(Continued)

(58) Field of Classification Search
CPC ... H01F 1/0557; C22C 19/07; C22C 2202/02; C22F 1/10; H02K 1/02; H02K 7/1823;
(Continued)

(56) References Cited

U.S. PATENT DOCUMENTS

| | | | | |
|---|---|---|---|---|
| 6,648,984 B2* | 11/2003 | Takaki | .................. | H01F 1/0577 148/101 |
| 7,048,808 B2* | 5/2006 | Kaneko | ................. | H01F 1/0577 148/101 |

(Continued)

FOREIGN PATENT DOCUMENTS

| CN | 105122388 A | 12/2015 |
|---|---|---|
| CN | 105264621 A | 1/2016 |

(Continued)

*Primary Examiner* — John K Kim
(74) *Attorney, Agent, or Firm* — Finnegan, Henderson, Farabow, Garrett & Dunner, L.L.P.

(57) ABSTRACT

A high-performance permanent magnet is provided. The magnet is expressed by a composition formula: $R_p Fe_q M_r Cu_t Co_{100-p-q-r-t}$. The magnet includes a sintered body including: a plurality of crystal grains each having a $Th_2 Zn_{17}$ crystal phase; and a plurality of grain boundaries between the crystal grains. If an oxide phase of the R element is defined by a continuous region that is disposed in the sintered body and contains the R element and oxygen having a concentration of 85 atomic percent or more, a ratio of the number of the oxide phases in the grain boundaries to the number of the crystal grains is 1.1 or less.

11 Claims, 3 Drawing Sheets

(51) Int. Cl.
*H02K 7/18* (2006.01)
*H01F 1/055* (2006.01)
*C22C 19/07* (2006.01)
*C22F 1/10* (2006.01)
*B22F 1/00* (2006.01)
*B22F 3/10* (2006.01)
*H02K 7/00* (2006.01)

(52) U.S. Cl.
CPC .......... *H02K 7/1823* (2013.01); *B22F 1/0085* (2013.01); *B22F 3/1007* (2013.01); *B22F 2201/11* (2013.01); *B22F 2301/15* (2013.01); *B22F 2304/10* (2013.01); *C22C 2202/02* (2013.01); *H02K 7/003* (2013.01)

(58) Field of Classification Search
CPC ...... H02K 7/003; H02K 1/276; H02K 1/2766; B22F 1/0085; B22F 3/1007; B22F 2201/11; B22F 2301/15; B22F 2304/10; B22F 3/02; B22F 3/10; B22F 3/1017; B22F 5/008; B22F 2009/044; B22F 2201/20; B22F 2202/05; B22F 2998/10; B22F 2999/00
USPC .................................................. 310/44, 152
See application file for complete search history.

(56) References Cited

U.S. PATENT DOCUMENTS

| | | | |
|---|---|---|---|
| 9,715,956 B2* | 7/2017 | Horiuchi | C22C 19/07 |
| 10,304,600 B2* | 5/2019 | Horiuchi | H01F 1/0557 |
| 2002/0062884 A1 | 5/2002 | Kaneko et al. | |
| 2003/0205294 A1* | 11/2003 | Takaki | H01F 1/0577 |
| | | | 148/105 |
| 2015/0143952 A1 | 5/2015 | Horiuchi et al. | |
| 2015/0270039 A1 | 9/2015 | Horiuchi et al. | |
| 2015/0270040 A1 | 9/2015 | Horiuchi et al. | |
| 2016/0155548 A1 | 6/2016 | Horiuchi et al. | |
| 2018/0190415 A1* | 7/2018 | Hagiwara | H02K 1/02 |

FOREIGN PATENT DOCUMENTS

| | | |
|---|---|---|
| JP | 08-134563 A | 5/1996 |
| JP | 2002-190404 A | 7/2002 |
| JP | 2014-192193 A | 10/2014 |
| WO | WO 2015/140829 A1 | 9/2015 |
| WO | WO 2015/140832 A1 | 9/2015 |
| WO | WO 2016/084118 A1 | 6/2016 |

* cited by examiner

PERMANENT MAGNET, ROTARY ELECTRIC MACHINE, AND VEHICLE

CROSS-REFERENCE TO RELATED APPLICATIONS

This application is a continuation of prior International Application No. PCT/JP2016/004114 filed on Sep. 9, 2016; the entire contents of all of which are incorporated herein by reference.

FIELD

Embodiments described herein relate generally to a permanent magnet, a rotary electric machine, and a vehicle.

BACKGROUND

As examples of a high-performance permanent magnet, rare-earth magnets such as a Sm—Co-based magnet and a Nd—Fe—B-based magnet are known. These magnets that are currently mass-produced contain a large amount of Fe or Co. Fe and Co contribute to an increase in saturation magnetization. A permanent magnet used in a drive motor of a vehicle such as a hybrid electric vehicle (HEV), an electric vehicle (EV), or a railway vehicle is required to have heat resistance. In a drive motor of a vehicle such as HEV, EV, or a railway vehicle, a permanent magnet that is a Nd—Fe—B-based magnet in which Dy replaces part of Nd to increase heat resistance is used, for instance. Since Dy is one of rare-earth elements, there is a demand for a permanent magnet not using Dy. A Sm—Co-based magnet is known as a magnet that has a system not using Dy yet exhibits excellent heat resistance, but has a drawback of being smaller in the maximum energy product $(BH)_{max}$ than a Nd—Fe—B-based magnet.

Factors determining a value of $(BH)_{max}$ of a permanent magnet include residual magnetization, a coercive force, and a squareness ratio. In order to increase the magnetization of a Sm—Co-based magnet, replacing part of Co by Fe and increasing the Fe concentration are effective. However, a Sm—Co-based magnet having a composition region high in the Fe concentration is likely to have a difficulty in having a high sintered body density and exhibiting an excellent squareness ratio. Under such circumstances, there is a demand for an art to achieve high residual magnetization and a high squareness ratio in a Sm—Co-based magnet having a high Fe concentration while keeping its coercive force sufficient.

DETAILED DESCRIPTION

A permanent magnet expressed by a composition formula: $R_pFe_qM_rCu_rCo_{100-p-q-r-t}$. R is at least one element selected from the group consisting of rare-earth elements, M is at least one element selected from the group consisting of Zr, Ti, and Hf, p is a number satisfying $10.8 \leq p \leq 12.5$ atomic percent, q is a number satisfying $28 \leq q \leq 40$ atomic percent, r is a number satisfying $0.88 \leq r \leq 4.5$ atomic percent, and t is a number satisfying $3.5 \leq t \leq 13.5$ atomic percent. The magnet comprises a sintered body including: a plurality of crystal grains each having a $Th_2Zn_{17}$ crystal phase; and a plurality of grain boundaries between the crystal grains. If an oxide phase of the R element is defined by a continuous region that is disposed in the sintered body and contains the R element and oxygen having a concentration of 85 atomic percent or more, a ratio of the number of the oxide phases in the grain boundaries to the number of the crystal grains is 1.1 or less.

Embodiments will be hereinafter described with reference to the drawings. Note that the drawings are schematic, and for example, a relation between thickness and planar dimension, a thickness ratio among layers, and so on may be different from actual ones. Further, in the embodiments, substantially the same constituent parts are denoted by the same reference signs and a description thereof will be omitted.

First Embodiment

A permanent magnet of this embodiment has a composition expressed by a composition formula: $R_pFe_qM_rCu_rCo_{100-p-q-r-t}$ (in the formula, R is one kind of rare-earth element or more, M is at least one element selected from the group consisting of Zr, Ti, and Hf, p is a number satisfying $10.8 \leq p \leq 12.5$ at %, q is a number satisfying $28 \leq q \leq 40$ at %, r is a number satisfying $0.88 \leq r \leq 4.5$ at %, and t is a number satisfying $3.5 \leq t \leq 13.5$ at %).

The R element brings high magnetic anisotropy and imparts a high coercive force to the permanent magnet. As the R element, one kind of rare-earth element or more are used. As the R element, at least one element selected from the group consisting of yttrium (Y), samarium (Sm), cerium (Ce), neodymium (Nd), and praseodymium (Pr) is more preferably used, and Sm is especially preferably used. When 50 at % or more of the R element is Sm, it is possible to increase performance, in particular, a coercive force of the permanent magnet with good reproducibility. More preferably, 70 at % or more of the R element is Sm, and still more preferably, 90 at % or more of the R element is Sm.

The content of the R element is, for example, not less than 10.8 at % nor more than 12.5 at %. A less than 10.8 at % content of the R element results in the precipitation of a large amount of an a-Fe phase and does not enable to obtain a sufficient coercive force. On the other hand, an over 12.5% content of the R element leads to a great decrease in saturation magnetization. The content of the R element is more preferably not less than 10.9 at % nor more than 12.0 at %, and still more preferably not less than 11.0 at % nor more than 11.6 at %.

As the M element, at least one element selected from the group consisting of titanium (Ti), zirconium (Zr), and hafnium (Hf) is used. Compounding the M element makes it possible for a high coercive force to be exhibited in a composition having a high Fe concentration. The content of the M element is not less than 0.88 at % nor more than 4.5 at %. The M element whose content is less than 0.88 at % has a small effect of increasing the Fe concentration, and its content of over 4.5 at % results in the generation of a phase excessively containing the M element, which is likely to deteriorate magnetic properties. The content of the M element is preferably not less than 1.14 at % nor more than 3.58 at %, and more preferably not less than 1.55 at % nor more than 2.23 at %.

The M element may be any of Ti, Zr, and Hf, but preferably contains at least Zr. In particular, the M element including 50 at % Zr or more can have a further improved effect of increasing a coercive force of the permanent magnet. On the other hand, since Hf in the M element is very expensive, an amount of Hf used, even when it is used, is preferably small. The content of Hf is preferably less than 20 at % of the M element.

Copper (Cu) makes the permanent magnet exhibit a high coercive force. The content of Cu is not less than 3.5 at % nor more than 13.5 at %. Since Cu is a nonmagnetic element, an over 13.5% content of Cu results in a great decrease in magnetization. Cu whose content is less than 3.5 at % has a difficulty in imparting a high coercive force. The content of Cu is preferably not less than 3.9 at % nor more than 9.0 at %, and more preferably not less than 4.3 at % nor more than 5.8 at %.

Iron (Fe) is responsible mainly for the magnetization of the permanent magnet. The permanent magnet containing a large amount of Fe can have increased saturation magnetization. However, too large a content of Fe results in the precipitation of the a-phase or the like to decrease a coercive force. A compounding amount of Fe is within a range of not less than 28 at % nor more than 40 at %. Its compounding amount is more preferably not less than 29 at % nor more than 36 at %, and still more preferably not less than 30 at % nor more than 33 at %.

Cobalt (Co) is an element not only responsible for the magnetization of the permanent magnet but also necessary for making the permanent magnet exhibit a high coercive force. Further, the permanent magnet containing a large amount of Co has a high Curie temperature and thus has improved thermal stability. Co whose compounding amount is small is poor in these effects. However, an excessively large content of Co in the permanent magnet leads to a relative decrease in the content of Fe, which may decrease magnetization. The content (at %) of Co is within a range determined by p, q, r, and t (100-p-q-r-t).

Part of Co may be replaced by at least one kind of element A selected from the group consisting of nickel (Ni), vanadium (V), chromium (Cr), manganese (Mn), aluminum (Al), silicon (Si), gallium (Ga), niobium (Nb), tantalum (Ta), and tungsten (W). These substitution elements contribute to an improvement in magnet properties, for example, a coercive force. However, the excessive replacement of Co by A may lead to a decrease in magnetization, and therefore, a replacement amount by the element A is set within a range of 20 at % or less of Co.

The composition of the permanent magnet is measured by, for example, a high-frequency inductively coupled plasma (ICP) emission spectrochemical analysis method, SEM-energy dispersive X-ray spectroscopy (SEM-EDX), transmission electron microscope-EDX (TEM-EDX), or the like.

The above-described permanent magnet includes a sintered body having a two-dimensional metallic structure including: a plurality of crystal grains constituting main phases; and crystal grain boundaries (also called grain boundary phases) of the crystal grains. The main phase is defined as a phase having the largest volume ratio out of all the constituent phases. A ratio of the main phases is preferably 70% by volume or more, and more preferably 90% by volume or more of all the constituent phases. The aforesaid metallic structure is observed with, for example, a scanning electron microscope (SEM).

The crystal grains each have a hexagonal $Th_2Zn_{17}$ crystal phase (2-17 crystal phase). The grain size of the crystal grains is not less than 10 μm nor more than 200 μm. The average grain size of the plural crystal grains is preferably 60 μm or more. A c-axis of the $Th_2Zn_{17}$ crystal phase is preferably parallel or substantially parallel to an easy magnetization axis. Substantial parallel includes a direction deviating from the parallel direction by not less than −10 degrees nor more than 10 degrees. In a cross section including the c-axis of the $Th_2Zn_{17}$ crystal phase, the inside of the crystal grain has a cell structure in which a cell wall phase formed of a $CaCu_5$ crystal phase surrounds a cell phase formed of the $Th_2Zn_{17}$ crystal phase.

The grain boundary phases are present around the crystal grains. A melting point of the grain boundary phases is lower than that of the main phases. The grain boundary phases each include, for example, a $Ce_2Ni_7$ crystal phase (2-7 crystal phase), a $CaCu_5$ crystal phase (1-5 crystal phase), and so on. The grain boundary phases may contain Cu and the M element whose concentrations are higher than those in the $Th_2Zn_{17}$ crystal phases.

The metallic structure may further include a platelet phase, an oxide phase of the R element (mainly a Sm oxide phase), a segregation phase containing the M element (mainly a carbide phase of ZrC or the like), and a low-melting-point phase such as a $Ce_2Ni_7$ crystal phase. The low-melting-point phase such as the $Ce_2Ni_7$ crystal phase greatly grows in the grain boundary phase. Accordingly, the concentrations of Cu and the M element therein are likely to be higher than in the $Th_2Zn_{17}$ crystal phase.

Volume ratios of the phases of the metallic structure are comprehensively determined based on, for example, the combination of observation by an electron microscope or an optical microscope, X-ray diffraction, and so on, and can be found by an areal analysis method of an electron micrograph of a photographed cross section of the permanent magnet. As the cross section of the permanent magnet, a cross section of a substantially center portion of a surface having the largest area of a sample is used.

The permanent magnet of the embodiment is capable of exhibiting a high coercive force owing to a phase-separation structure including the $Th_2Zn_{17}$ crystal phase and the $CaCu_5$ crystal phase. The phase separation structure has a coercive force mechanism of what is called a domain wall pinning type in which, for example, the cell wall phase functions as a pinning site to inhibit domain wall displacement.

In the coercive force mechanism of the domain wall pinning type, even if a magnetization-reversal nucleus serving as a starting point of magnetization reversal is generated, the domain wall displacement does not occur unless an external field exceeding a pinning potential is applied. Therefore, a dominant factor determining the magnitude of the coercive force is the structure of the phase separation structure.

In order to increase the magnetization of an R—Co-based permanent magnet, it is effective to replace part of Co by Fe and increase the Fe concentration. Accordingly, the permanent magnet of the embodiment contains not less than 28 at % nor more than 40 at % Fe. However, a high Fe concentration makes a coercive force difficult to be exhibited and is likely to cause the generation of the magnetization-reversal nucleus to make it difficult to obtain a good squareness ratio, and thus becomes a factor to decrease $(BH)_{max}$.

The magnetization-reversal nucleus is likely to be generated in a magnetically weak portion. The magnetically weak portion on a macro scale is the periphery of the grain boundary phase, a nonmagnetic phase, or the like, for instance. When there are many magnetically weak portions, regions partly magnetically reversed are dispersed by an external field. This leads to a poor squareness ratio.

The oxide phase of the R element, which is one of the nonmagnetic phases, precipitates in the crystal grain or in the grain boundary phase to be a starting point of the magnetization-reversal nucleus, and thus deteriorates the magnetic properties such as magnetization. The precipitation of the oxide phase of the R element is mainly caused by a reaction of the R element (in particular, Sm) in the main phase and oxygen.

In the permanent magnet of this embodiment, a precipitation amount of the oxide phase of the R element is reduced within a range capable of maintaining a sufficient sintered body density, and in addition, the oxide phase precipitated in the grain boundary phase is reduced. Consequently, it is possible to achieve an excellent squareness ratio while maintaining a sufficient coercive force, in a high iron concentration composition region.

If the oxide phase of the R element precipitates in the grain boundary phase, the magnetization reversal is likely to occur. On the other hand, by precipitating the oxide phase of the R element in the crystal grain where the magnetization reversal is difficult to occur, it is possible to reduce the generation probability of the magnetization-reversal nucleus in the periphery of the nonmagnetic phase.

In the sintered body of the permanent magnet of the embodiment, a ratio of the number Nb of the oxides of the R element present in the grain boundary phases to the number Ng of the crystal grains (Nb/Ng) is preferably 1.1 or less (Nb/Ng≤1.1). When Nb/Ng is larger than 1.1, the number of the oxide phases of the R element present in the grain boundary phases is large. Nb/Ng is preferably 1.0 or less, and still more preferably 0.8 or less.

By inhibiting the precipitation of the oxide phases of the R element present in the grain boundary phases, it is possible for the R—Co-based magnet containing a high-concentration Fe to exhibit high residual magnetization and an excellent squareness ratio while maintaining a sufficient coercive force. That is, it is possible to improve the value of $(BH)_{max}$ of the permanent magnet, which makes it possible to provide a high-performance permanent magnet.

Nb/Ng is measured as follows. The composition of the permanent magnet is analyzed by SEM-EDX. In SEM, a region of not smaller than 200 µm×400 µm nor larger than 300 µm×500 µm is observed at 300 magnifications, for instance. An acceleration voltage is preferably 20 kV.

In the analysis by SEM-EDX, the composition is measured in a surface portion and an inner portion of a cross section taken at a center portion of the longest side in a surface having the largest area, perpendicularly to the side (perpendicularly to a tangent of the center portion in a case of a curve). Measurement points are as follows. First reference lines and second reference lines are provided, the first reference lines being drawn perpendicularly to respective sides in the aforesaid cross section from starting points, which are ½ positions of the sides, inwardly up to end portions, and the second reference lines being drawn at ½ positions of interior angles of corner portions, from starting points, which are centers of the corners, inwardly up to end portions, and 1% positions of the lengths of the first and second reference lines from the starting points of the first and second reference lines are defined as the surface portion and 40% positions thereof are defined as the inner portion. When the corner portions have curvature because of chamfering or the like, points of intersection of extensions of adjacent sides are defined as end portions of the sides (centers of the corner portions). In this case, the measurement points are positions determined not from the points of intersection but from portions in contact with the reference lines.

When the measurement points are set as above, in a case where the cross section is, for example, a quadrangle, the number of the reference lines is totally eight, with the four first reference lines and the fours second reference lines, and the number of the measurement points is eight in each of the surface portion and the inner portion.

Figure 1:
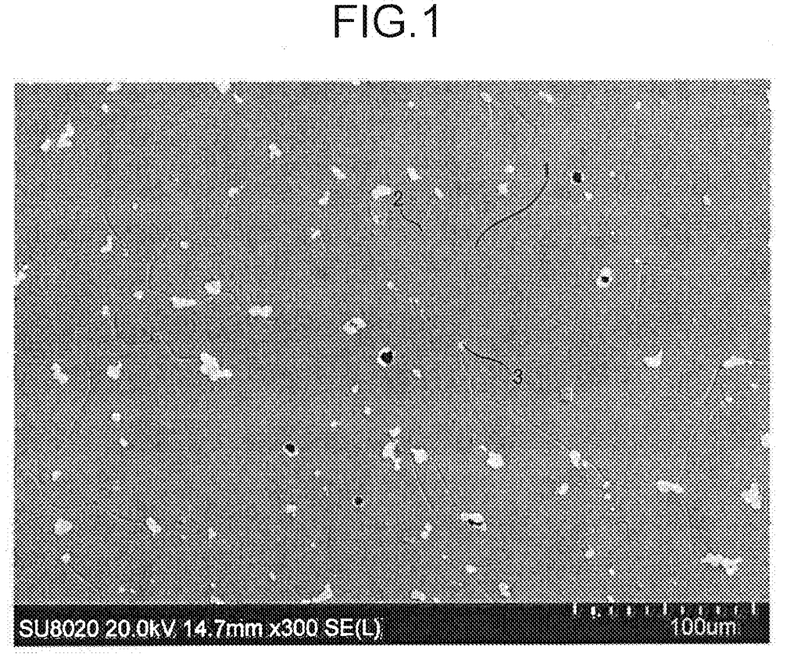
FIG. 1 is a SEM image illustrating part of a cross section of a sintered body.

FIG. 1 is a SEM image illustrating an example of part of the cross section of the sintered body. The cross section illustrated in FIG. 1 has the crystal grains 1, the grain boundary phases 2, and the oxide phases 3 of the R element. The oxide phase 3 of the R element is defined as a continuous region containing the R element and oxide, with the concentration of the R element and the oxide being 85 at % or more. Further, constituent elements of the oxide phase 3 of the R element is mostly the R element and the oxide, with the concentration of the R element being 35 at % or more. For observing the crystal grains 1 and the grain boundary phases 2, the sample is chemically etched or Ar-etched, for instance. For the chemical etching, nital can be used, for instance.

Figure 2:
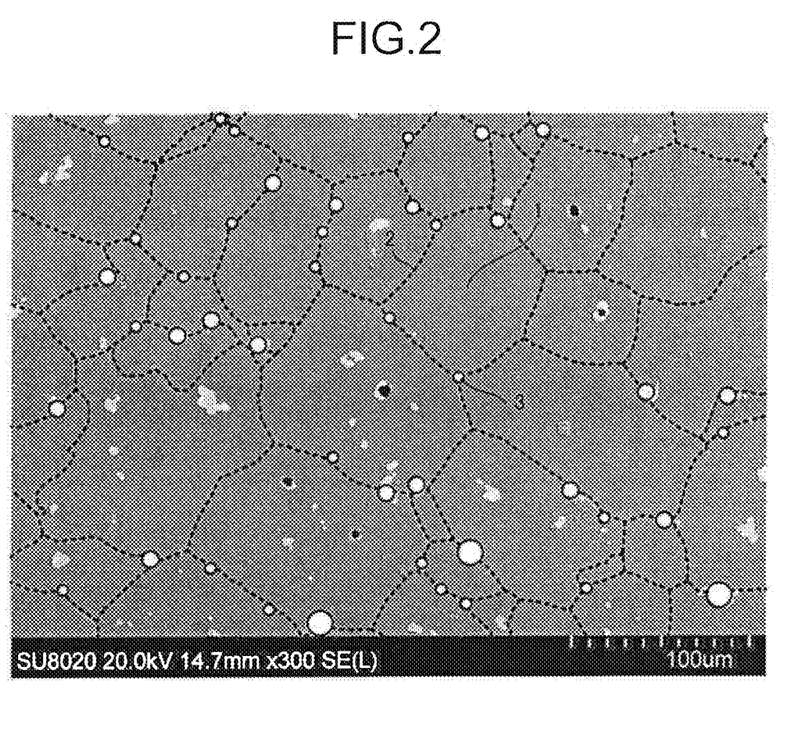
FIG. 2 is a SEM image illustrating part of the cross section of the sintered body.

Next, in the SEM image, the number (Ng) of the crystal grains 1 and the number (Nb) of the oxide phases 3 of the R element present in the grain boundary phases 2 are counted. The oxide phase present in the crystal grain boundary (grain boundary phase) is defined as the oxide phase whose region is in contact with or intersects with the crystal grain boundary (grain boundary phase). FIG. 2 is a SEM image including dotted lines and outline circles which respectively indicate the grain boundary phases 2 and the oxide phases 3 of the R element present in the grain boundary phases 2, illustrated in FIG. 1. The oxide phases 3 of the R element observed by SEM each have a white granular shape with an about 0.5 to 20 m diameter as illustrated in FIG. 1 and FIG. 2.

In this embodiment, Nb/Ng is preferably within the aforesaid range at all the eight points in each of the surface portion and the inner portion, but may be within the aforesaid range at at least four points or more in each of the surface portion and the inner portion. In this case, the relation of the surface portion and the inner portion is not stipulated in the single reference line. After an observation surface of the inner portion of the sintered body thus stipulated is smoothed by polishing, the observation is conducted. An $Nb_{total}/Ng_{total}$ ratio is measured at each of the measurement points, and an average value of these measurement values excluding the largest value and the smallest value is found, and this average value is defined as Nb/Ng.

In the permanent magnet of this embodiment, a porosity of the sintered body is preferably 2% or less, more preferably 1.5% or less, and still more preferably 1.1% or less. That the porosity is low in a sintered magnet means that a ratio of main phases per unit volume is high and high magnetization can be obtained. A vacancy decreases magnetization, and in the periphery of the vacancy, a demagnetizing field is generated and the magnetization decreases by a ratio of the deficient main phase or more. With the porosity being 2% or less, it is possible to inhibit the decrease in the magnetization caused by the vacancies.

The vacancies are observed as black point holes in the SEM image illustrated in FIG. 1, for instance. The porosity is expressed as $S_{vacancy}/S_{total} \times 100$ using the area ($S_{total}$) of the SEM image and the total area of the vacancies ($S_{vacancy}$).

The squareness ratio is evaluated as follows. First, a DC magnetizing property at a room temperature is measured with a direct current B-H tracer. Next, from a B-H curve obtained from the measurement result, residual magnetization $M_r$, a coercive force iHc, and the maximum energy product (BH)max which are basic properties of a magnet are found. At this time, a theoretical maximum value (BH)max is found from the following expression (1) using $M_r$.

$$(BH)\text{max(theoretical value)}=M_r^2/4\mu_0 \quad (1)$$

An index (α) of the squareness ratio is evaluated based on a ratio of (BH)max obtained in the measurement and (BH) max (theoretical value), and is found by the following expression (2).

$$(BH)\text{max(measurement value)}/(BH)\text{max(theoretical value)}\times 100 \quad (2)$$

Next, an example of a method of manufacturing the permanent magnet will be described. First, an alloy powder containing predetermined elements necessary for synthesizing the permanent magnet is prepared. For example, it is possible to prepare the alloy powder by pulverizing an alloy ingot obtained through the casting of molten metal obtained by an arc melting method or a high-frequency melting method. The alloy powder may be prepared by mixing a plurality of powders different in composition, so as to have a desired composition.

Other examples of the method of preparing the alloy powder include a mechanical alloying method, a mechanical grinding method, a gas atomization method, and a reduction diffusion method. Using a strip cast method makes it possible to improve uniformity of the alloy powder. Further heat-treating the alloy powder or an alloy material not yet pulverized enables the homogenization of the material. It is possible to pulverize the material by using a jet mill, a ball mill, or the like, for instance. Incidentally, pulverizing the material in an inert gas atmosphere or an organic solvent can prevent the oxidation of the powder.

The average particle size of the powder obtained by the pulverization is preferably not less than 5 μm nor more than 8 μm. The average particle size of the powder obtained by the pulverization is more preferably not less than 5.5 μm nor more than 7.5 μm, and still more preferably not less than 6 μm nor more than 7 μm. By setting a ratio of particles whose particle size is 1 μm or less to 1% by volume or less, it is possible to reduce an amount of an oxide. By setting a ratio of particles whose particle size is 10 μm or more to 2% by volume or less, the porosity of the sintered body fabricated by sintering is reduced, which achieves a sufficient density.

The average particle size of the powder is defined as a value of particle size (median diameter: d50) whose cumulative distribution is 50% in particle size distribution measured by a laser diffraction method or the like. For the fabrication of such a powder, a jet mill is suitably used.

Next, the alloy powder is filled in a mold placed in an electromagnet and is press-formed while a magnetic field is applied thereto, to be manufactured into a green compact whose crystal axes are oriented. As a forming method, there are a dry forming method and a wet forming method. In the dry forming method, a minute amount of a lubricating oil is preferably added for improving the fluidity of the powder and preventing the oxidation of the powder. Examples of the lubricating oil include silicone oil and mineral oil.

Next, the aforesaid green compact is heat-treated at not lower than 1180° C. nor higher than 1250° C. for not less than 0.5 hours nor more than 15 hours to be sintered. The heat-treatment temperature of lower than 1180° C. causes the sintered body to have an insufficient density. The heat-treatment temperature of over 1250° C. may deteriorate the magnetic properties due to, for example, the excessive evaporation of the R element such as Sm in the powder. For example, the heat-treatment temperature is preferably not lower than 1180° C. nor higher than 1220° C., and more preferably not lower than 1190° C. nor higher than 1210° C.

The heat-treatment time of less than 0.5 hours may not achieve a sufficient density. The heat-treatment time of over fifteen hours may result in the excessive evaporation of the R element in the powder to deteriorate the magnetic properties. The heat-treatment time is preferably not less than one hour nor more than ten hours, and more preferably not less than one hour nor more than seven hours. In the above sintering, the heat treatment is preferably performed in a vacuum or an inert atmosphere of argon gas or the like in order to inhibit the oxidation. For example, by keeping the atmosphere vacuum until the temperature becomes close to the retention temperature, and thereafter changing the atmosphere to an argon atmosphere, followed by isothermal holding, it is possible to reduce the porosity to improve the density of the sintered body.

The obtained sintered body is heat-treated in two stages or more, and after the heat treatment, is quenched at a cooling rate of 150° C./minute or more. The heat treatment in the first stage is quality improvement heat treatment that keeps the sintered body at a temperature slightly lower than the heat treatment temperature of the sintering for a long time. The heat treatment in the second stage is solution heat treatment at a temperature lower than the temperature of the heat treatment in the first stage. The solution heat treatment can make a $TbCu_7$ crystal phase (1-7 phase) being a precursor phase a single phase. Incidentally, both of the heat treatments are preferably performed in a vacuum or an inert atmosphere of argon gas or the like.

In the quality improvement heat treatment, the heat treatment is performed by holding the sintered body at a temperature that is lower than the heat-treatment temperature of the sintering by 10° C. or more and is higher than the heat-treatment temperature of the solution heat treatment by 10° C. or more, for not less than four hours nor more than thirty hours, for instance.

The temperature of the quality improvement heat treatment is preferably not lower than 1130° C. nor higher than 1190° C. When this temperature is too higher than the heat-treatment temperature of the sintering, a heterophase occurring from a liquid phase may be generated to deteriorate the magnetic properties, and the evaporation of the R element may be caused. Further, in the solution heat treatment, the temperature is low and element diffusion is slow and the crystal does not grow sufficiently. When the time of the quality improvement heat treatment is less than four hours, the crystal growth and element diffusion do not progress sufficiently, making it possible to lower a generation ratio of the oxide in the crystal grains. When the time of the quality improvement heat treatment is over thirty hours, the R element may evaporate and productivity may become low. The time of the quality improvement heat treatment is preferably not less than 12 hours nor more than 28 hours, and more preferably not less than 14 hours nor more than 24 hours.

In the solution heat treatment, the heat treatment is performed at a temperature lower than the temperature of the quality improvement heat treatment by 10° C. or more. The temperature of the solution heat treatment is preferably not lower than 1100° C. nor higher than 1180° C. When temperature of the solution heat treatment is lower than 1100° C. or higher than 1180° C., a ratio of phases other than the precursor phase becomes small, which may deteriorate the magnetic properties. The temperature of the solution heat treatment is preferably not lower than 1110° C. nor higher than 1170° C., for instance.

The time of the solution heat treatment is preferably not less than four hours nor more than thirty hours. When the time of the solution heat treatment is less than four hours, element diffusion becomes insufficient, which is likely to make the constituent phases nonuniform and thus may deteriorate the magnetic properties. When the time of the solution heat treatment is over thirty hours, the R element in the sintered body may evaporate, and productivity lowers. The time of the solution heat treatment is more preferably not less than four hours nor more than twelve hours.

By performing the quenching down to a room temperature at a cooling rate of 150° C./minute or more after the two-stage heat treatment, it is possible to stabilize the $TbCu_7$ crystal phases, so that a coercive force is easily exhibited. When the cooling rate is less than 150° C./minute, the $Ce_2Ni_7$ crystal phases and the $Th_2Zn_{17}$ crystal phases are easily generated during the cooling.

Next, aging treatment is applied to the sintered body having undergone the solution heat treatment to form a phase separation region. In the aging treatment, after the sintered body is heat-treated at a temperature of not lower than 700° C. nor higher than 900° C. for not less than 10 hours nor more than 100 hours, it is preferable to gradually cool the sintered body down to a temperature of not lower than 20° C. nor higher than 600° C. at a cooling rate of not less than 0.1° C./minute nor more than 5° C./minute, and thereafter cool it to a room temperature. By executing the aging treatment under such a condition, it is possible to improve a coercive force and so on of the permanent magnet having the phase separation structure. The aging treatment is preferably performed in a vacuum or an inert gas atmosphere of argon gas or the like for the purpose of preventing the oxidation.

When the temperature of the aging treatment is lower than 700° C. or is higher than 900° C., it is not possible to obtain a homogeneous mixed structure of the cell phases and the cell wall phases, which may deteriorate the magnetic properties of the permanent magnet. The temperature of the aging treatment is preferably not lower than 750° C. nor higher than 880° C., and more preferably not lower than 780° C. nor higher than 850° C.

When the time of the aging treatment is less than ten hours, there is a possibility that the cell wall phases are not sufficiently generated or element diffusion is insufficient. On the other hand, when the retention time is over 100 hours, a volume fraction of the cell phases decreases due to the thickened cell wall phases, and it may not be possible to obtain good magnetic properties because the crystal grains become coarse. The time of the aging heat treatment is more preferably not less than ten hours nor more than ninety hours, and still more preferably not less than twenty hours nor more than eighty hours.

When the cooling rate of the gradual cooling is less than 0.1° C./minute, productivity may lower to increase the cost. When the cooling rate of the gradual cooling is over 5° C./minute, it is not possible to obtain the homogeneous mixed structure of the cell phases and the cell wall phases, which may deteriorate the magnetic properties of the permanent magnet. The cooling rate after the aging treatment is preferably not less than 0.3° C./minute nor more than 4° C./minute, and more preferably 0.5° C./minute nor more than 3° C./minute.

Preliminary aging treatment that is heat treatment at a lower temperature than the aging heat treatment temperature may be performed before the above-described aging treatment. In the preliminary aging treatment, it is preferable to perform heat treatment at a temperature of not lower than 500° C. nor higher than 900° C. for 0.5 to 10 hours, followed by gradual cooling down to not lower than 20° C. nor higher than 450° C. at a cooling rate of not less than 0.1° C./minute nor more than 5° C./minute. Performing the preliminary aging treatment can improve the squareness ratio which is a magnetic property.

Second Embodiment

The permanent magnet of the first embodiment is usable in rotary electric machines such as various motors included in automobiles, railway vehicles, and the like and such as generators. It is also usable as stationary magnets and variable magnets of variable magnetic flux motors and variable magnetic flux generators. By using the permanent magnet of the first embodiment, various kinds of motors and generators are constituted. In a case where the permanent magnet of the first embodiment is applied to a variable magnetic flux motor, the arts disclosed in, for example, Japanese Laid-open Patent Publication No. 2008-29148 and Japanese Laid-open Patent Publication No. 2008-43172 can be employed for the structure and a drive system of the variable magnetic flux motor.

Figure 3:
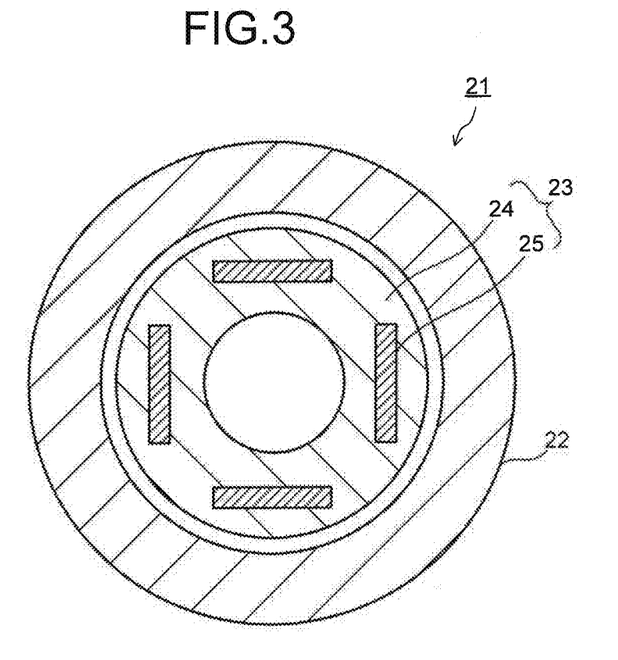
FIG. 3 is a view illustrating a permanent magnet motor.

Next, a rotary electric machine including the above-described permanent magnet will be described with reference to the drawings. FIG. 3 is a view illustrating a permanent magnet motor in this embodiment. In the permanent magnet motor 21 illustrated in FIG. 3, a rotor 23 is disposed in a stator 22. In an iron core 24 of the rotor 23, permanent magnets 25 each being the permanent magnet of the first embodiment are disposed. The use of the permanent magnet of the first embodiment enables efficiency enhancement, downsizing, cost reduction, and so on of the permanent magnet motor 21, based on the properties of the permanent magnet.

Figure 4:
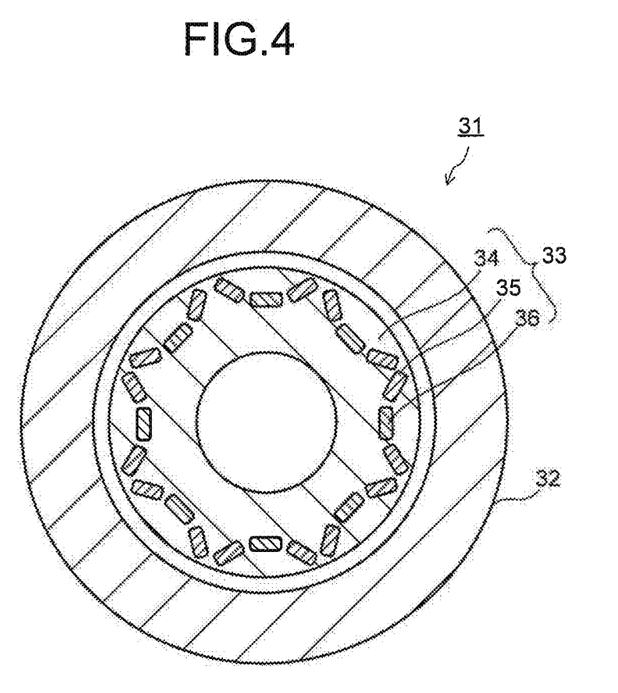
FIG. 4 is a view illustrating a variable magnetic flux motor.

FIG. 4 is a view illustrating a variable magnetic flux motor according to this embodiment. In the variable magnetic flux motor 31 illustrated in FIG. 4, a rotor 33 is disposed in a stator 32. In an iron core 34 of the rotor 33, the permanent magnets of the first embodiment are disposed as stationary magnets 35 and variable magnets 36. The magnetic flux density (flux quantum) of the variable magnets 36 is variable. The variable magnets 36 are not influenced by a Q-axis current and can be magnetized by a D-axis current owing to its magnetization direction perpendicular to a Q-axis direction. A magnetization winding (not illustrated) is provided on the rotor 33. When a current is passed to this magnetization winding from a magnetizing circuit, its magnetic field directly acts on the variable magnets 36.

According to the permanent magnet of the first embodiment, it is possible for the stationary magnets 35 to have a suitable coercive force. In the case where the permanent magnet of the first embodiment is used as the variable magnets 36, by changing the various conditions (such as the aging treatment condition) of the above-described manufacturing method, the coercive force is controlled within a range of not less than 100 kA/m nor more than 500 kA/m, for instance. It should be noted that, in the variable magnetic flux motor 31 illustrated in FIG. 4, the permanent magnet of the first embodiment can be used both as the stationary magnets 35 and the variable magnet s36, but the permanent magnet of the first embodiment may be used as either of these. The variable magnetic flux motor 31 is capable of outputting a large torque with a small device size, and thus is suitable for motors for vehicles such as a hybrid electric vehicle and an electric vehicle whose motors are required to have a high output and a smaller size.

Figure 5:
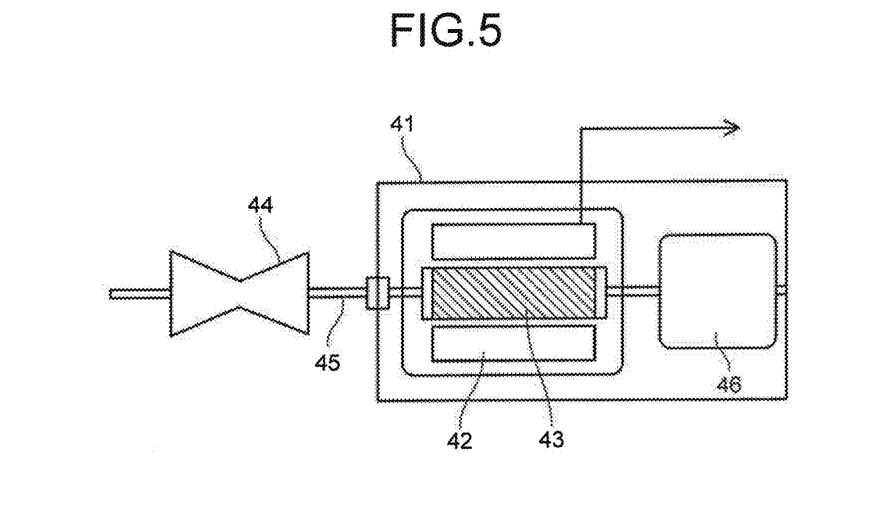
FIG. 5 is a view illustrating a generator.

FIG. 5 illustrates a generator according to this embodiment. The generator 41 illustrated in FIG. 5 includes a stator 42 using the above-described permanent magnet. A rotor 43 disposed inside the stator 42 is connected through a shaft 45 to a turbine 44 provided at one end of the generator 41. The turbine 44 is rotated by an externally supplied fluid, for instance. Incidentally, it is also possible to rotate the shaft 45 by a transmitted dynamic rotation such as regenerative energy of a vehicle such as an automobile, instead of by the turbine 44 rotated by the fluid. Various well-known structures can be adopted for the stator 42 and the rotor 43.

The shaft 45 is in contact with a commutator (not illustrated) disposed opposite to the turbine 44 across the rotor 43, and an electromotive force generated by the rotation of the rotor 43 as an output of the generator 41 passes through an isolated phase bus and a main transformer (not illustrated) to be boosted to a system voltage and the system voltage is transmitted. The generator 41 may be either an ordinary generator or a variable magnetic flux generator. Incidentally, in the rotor 43, electrostatic charge is generated by static electricity from the turbine 44 or by a shaft current accompanying the power generation. Accordingly, the generator 41 is provided with a brush 46 for discharging the charged electricity of the rotor 43.

Applying the above-described permanent magnet to the generator as described above makes it possible to obtain effects of efficiency enhancement, downsizing, cost reduction, and so on.

EXAMPLES

Examples 1, 2

After raw materials were weighed so as to form the compositions shown in Table 1, alloy ingots were fabricated by high-frequency melting. After roughly pulverized, the ingots were finely pulverized by a jet mill into alloy fine powders with a 6 μm average particle size. The obtained fine powders were pressed into green compacts under a 1 t pressing pressure in a 1.5 T magnetic field.

The obtained green compacts were sintered. In the sintering, they were increased in temperature up to 1175° C. in a vacuum and were held for thirty minutes, and thereafter were supplied with Ar, were increased in temperature up to 1210° C. in an Ar atmosphere, and were held for three hours.

Next, after subjected to quality improvement heat treatment by being held at 1180° C. for fourteen hours in the Ar atmosphere, they were subjected to solution heat treatment by being held at 1160° C. for twelve hours, and were cooled down to a room temperature at a rate of 170° C./minute.

Next, the sintered bodies having undergone the solution heat treatment were heat-treated at 830° C. for forty hours in the Ar atmosphere as aging treatment, thereafter were gradually cooled down to 300° C. at a cooling rate of 0.7° C./minute, and were further cooled down to a room temperature. Through the above processes, sintered magnets were obtained.

Further, Nb/Ng, residual magnetization $M_r$, a coercive force iHc, an index α of a squareness ratio, and a porosity of each of the sintered magnets were measured. Table 2 shows these results.

Examples 3, 4

After raw materials were weighed so as to form the compositions shown in Table 1, alloy ingots were fabricated by high-frequency melting. After roughly pulverized, the alloy ingots were finely pulverized by a jet mill into alloy fine powders with a 7 μm average particle size. The alloy fine powders were pressed into green compacts under a 2 t pressing pressure in a 1.5 T magnetic field. The green compacts were increased in temperature up to 1180° C. in a vacuum and were held for one hour, and thereafter were increased in temperature up to 1200° C. in an Ar atmosphere, and were held for five hours.

Next, after subjected to quality improvement heat treatment by being held at 1160° C. for twenty hours in the Ar atmosphere, they were subjected to solution heat treatment by being held at 1130° C. for twenty hours, and were cooled down to a room temperature at a rate of 180° C./minute.

Next, the sintered bodies having undergone the solution heat treatment were heat-treated at 700° C. for one hour in the Ar atmosphere and thereafter were heat-treated at 850° C. for fifty hours as aging treatment, thereafter were gradually cooled down to 500° C. at a cooling rate of 0.4° C./minute, and were further cooled down to a room temperature. Through the above processes, sintered magnets were obtained.

Further, Nb/Ng, residual magnetization $M_r$, a coercive force iHc, an index α of a squareness ratio, and a porosity of each of the sintered magnets were measured. Table 2 shows these results.

Comparative Example 1

After raw materials were weighed so as to form the composition shown in Table 1, a green compact was fabricated under the same condition as that of the example 1. The green compact was increased in temperature up to 1175° C. in a vacuum and was held for thirty minutes, and thereafter was supplied with Ar, was increased in temperature up to 1210° C. in an Ar atmosphere, and was held for three hours for sintering.

Next, after subjected to quality improvement heat treatment by being held at 1180° C. for four hours in the Ar atmosphere, it was subjected to solution heat treatment by being held at 1160° C. for three hours and was cooled down to a room temperature at a rate of 170° C./minute.

Next, the sintered body having undergone the solution heat treatment was heat-treated at 830° C. for forty hours in the Ar atmosphere as aging treatment, thereafter was gradually cooled down to 300° C. at a cooling rate of 0.7° C./minute, and was further cooled down to a room temperature. Through the above processes, a sintered magnet was obtained.

Further, Nb/Ng, residual magnetization $M_r$, a coercive force iHc, an index α of a squareness ratio, and a porosity of the sintered magnet were measured. Table 2 shows these results.

Comparative Example 2

After raw materials were weighed so as to form the composition shown in Table 1, an alloy ingot was fabricated by high-frequency melting. After roughly pulverized, the ingot was finely pulverized by a jet mill into an alloy fine powder with a 3 μm average particle size. The obtained fine powder was pressed into a green compact under a 1 t pressing pressure in a 1.5 T magnetic field. The obtained green compact was sintered under the same condition as that of the example 3 to be fabricated into a sintered body.

Next, after subjected to quality improvement heat treatment by being held at 1160° C. for twenty hours in the Ar atmosphere, it was subjected to solution heat treatment by being held at 1130° C. for twenty hours and was cooled down to a room temperature at a rate of 180° C./minute.

Next, the sintered body having undergone the solution heat treatment was heat-treated at 750° C. for two hours as preliminary aging treatment, and thereafter was gradually cooled down to 200° C. at a cooling rate of 1.5° C./minute. Subsequently, it was heat-treated at 850° C. for ten hours as aging treatment, thereafter was gradually cooled down to 600° C. at a cooling rate of 1° C./minute, and was further cooled down to a room temperature. The preliminary aging treatment and the aging treatment were both executed in an Ar atmosphere. Through the above processes, a sintered magnet was obtained.

Further, Nb/Ng, residual magnetization $M_r$, a coercive force iHc, an index α of a squareness ratio, and a porosity of the sintered magnet was measured. Table 2 shows these results.

Comparative Example 3

After raw materials were weighed so as to form the composition shown in Table 1, an alloy ingot was fabricated by high-frequency melting. After roughly pulverized, the ingot was finely pulverized by a jet mill into an alloy fine powder with a 10 μm average particle size. The obtained fine powder was pressed into a green compact under a 1 t pressing pressure in a 1.5 T magnetic field. The green compact was increased in temperature up to 1180° C. in a vacuum and was held for one hour, and thereafter was supplied with Ar, was increased in temperature up to 1210° C. in the Ar atmosphere, and was held for five hours for sintering.

Next, after subjected to quality improvement heat treatment by being held at 1170° C. for forty hours in the Ar atmosphere, it was subjected to solution heat treatment by being held at 1150° C. for 24 hours, and was cooled down to a room temperature at a rate of 180° C./minute.

Next, the sintered body having undergone the solution heat treatment was heat-treated at 750° C. for two hours as preliminary aging treatment, and thereafter was gradually cooled down to 200° C. at a cooling rate of 1.5° C./minute. Subsequently, it was heat-treated at 850° C. for ten hours as aging treatment, thereafter was gradually cooled down to 600° C. at a cooling rate of 1° C./minute, and was further cooled down to a room temperature. The preliminary aging treatment and the aging treatment were both executed in an Ar atmosphere. Through the above processes, a sintered magnet was obtained.

Further, Nb/Ng, residual magnetization $M_r$, a coercive force iHc, an index α of a squareness ratio, and a porosity of the sintered magnet were measured. Table 2 shows these results.

Comparative Example 4

After raw materials were weighed so as to form the composition shown in Table 1, an alloy ingot was fabricated by high-frequency melting. After roughly pulverized, the ingot was finely pulverized by a jet mill into an alloy fine powder with a 4 μm average particle size. The obtained fine powder was pressed into a green compact under a 1 t pressing pressure in a 1.5 T magnetic field. The green compact was increased in temperature up to 1170° C. in a vacuum and was held for one hour, and thereafter was supplied with Ar, was increased in temperature up to 1200° C. in the Ar atmosphere, and was held for five hours for sintering.

Next, after subjected to quality improvement heat treatment by being held at 1170° C. for 48 hours in the Ar atmosphere, it was subjected to solution heat treatment by being held at 1150° C. for twenty hours, and was cooled down to a room temperature at a rate of 180° C./minute.

Next, the sintered body having undergone the solution heat treatment was heat-treated at 750° C. for two hours as preliminary aging treatment, and thereafter was gradually cooled down to 200° C. at a cooling rate of 1.5° C./minute. Subsequently, it was heat-treated at 850° C. for ten hours as aging treatment, thereafter was gradually cooled down to 600° C. at a cooling rate of 1° C./minute, and was further cooled down to a room temperature. The preliminary aging treatment and the aging treatment were both executed in an Ar atmosphere. Through the above processes, a sintered magnet was obtained.

Further, Nb/Ng, residual magnetization $M_r$, a coercive force iHc, an index α of a squareness ratio, and a porosity of the sintered magnet was measured. Table 2 shows these results.

TABLE 1

| | Magnet Composition (at %) |
|---|---|
| Example 1 | $Sm_{11.36}Fe_{30.14}Zr_{1.77}Cu_{5.32}Co_{51.41}$ |
| Example 2 | $(Sm_{0.9}Nd_{0.1})_{11.49}Fe_{30.09}Zr_{1.77}Cu_{4.43}Co_{52.22}$ |
| Example 3 | $Sm_{11.24}Fe_{31.07}Zr_{1.78}Cu_{5.33}Co_{50.58}$ |
| Example 4 | $Sm_{11.24}Fe_{31.07}(Zr_{0.7}Ti_{0.2}Hf_{0.1})_{1.78}Cu_{5.33}Co_{50.58}$ |
| Comparative Example 1 | $Sm_{11.36}Fe_{30.14}Zr_{1.77}Cu_{5.32}Co_{51.41}$ |
| Comparative Example 2 | $Sm_{11.24}Fe_{31.07}Zr_{1.78}Cu_{5.33}Co_{50.58}$ |
| Comparative Example 3 | $Sm_{11.36}Fe_{30.14}Zr_{1.77}Cu_{5.32}Co_{51.41}$ |
| Comparative Example 4 | $Sm_{11.36}Fe_{30.14}Zr_{1.77}Cu_{5.32}Co_{51.41}$ |

TABLE 2

| | Nb/Ng | Residual Magnetization (T) | Coercive Force (kA/m) | α (%) | Porosity (%) |
|---|---|---|---|---|---|
| Example 1 | 0.8 | 1.23 | 1700 | 94 | 1.0 |
| Example 2 | 0.9 | 1.24 | 1600 | 93 | 1.1 |
| Example 3 | 0.8 | 1.25 | 1500 | 93 | 1.0 |
| Example 4 | 1.0 | 1.24 | 1600 | 93 | 1.2 |
| Comparative Example 1 | 1.4 | 1.18 | 1600 | 85 | 5.0 |
| Comparative Example 2 | 1.7 | 1.22 | 1500 | 86 | 1.5 |
| Comparative Example 3 | 1.5 | 1.14 | 1500 | 87 | 7.0 |
| Comparative Example 4 | 2.0 | 1.21 | 1600 | 86 | 1.1 |

The results of SEM observation show that the sintered magnets of the examples 1 to 4 and the comparative examples 1 to 4 each have crystal grains having $Th_2Zn_{17}$ crystal phases constituting main phases, crystal grain boundaries of the crystal grains, and oxide phases of the R element. Further, as is obvious from Table 2, the sintered magnets of the examples 1 to 4 all have a good squareness ratio with α exceeding 92% while maintaining high residual magnetization and coercive force. On the other hand, in the permanent magnets of the comparative examples 1 to 4, Nb/Ng is high and the oxide phases of the R element disperse in the crystal grain boundaries, and thus these magnets are poor in the squareness ratio.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes may be made without departing from the spirit of the inventions. The inventions described in the accompanying claims and their equivalents are intended to cover such forms or modifications as would fall within the scope and spirit of the inventions.

What is claimed is:

1. A permanent magnet expressed by
a composition formula: $R_p Fe_q M_r Cu_t Co_{100-p-q-r-t}$
where R is at least one element selected from the group consisting of rare-earth elements, M is at least one element selected from the group consisting of Zr, Ti, and Hf, p is a number satisfying $10.8 \leq p \leq 12.5$ atomic percent, q is a number satisfying $28 \leq q \leq 40$ atomic percent, r is a number satisfying $0.88 \leq r \leq 4.5$ atomic percent, and t is a number satisfying $3.5 \leq t \leq 13.5$ atomic percent,
the magnet comprising
a sintered body including: a plurality of crystal grains each having a $Th_2Zn_{17}$ crystal phase; and a plurality of grain boundaries between the crystal grains,
wherein if an oxide phase of the R element is defined by a continuous region that is disposed in the sintered body and contains the R element and oxygen having a concentration of 85 atomic percent or more, a ratio of the number of the oxide phases in the grain boundaries to the number of the crystal grains is 1.1 or less.

2. The magnet according to claim 1, wherein an average grain size of the crystal grains is 60 μm or more.

3. The magnet according to claim 1, wherein a porosity of the sintered body is 2% or less.

4. The magnet according to claim 1, wherein the crystal grains each have: a cell phase having the $Th_2Zn_{17}$ crystal phase; and a cell wall phase surrounding the cell phase.

5. The magnet according to claim 1, wherein 50 atomic percent or more of the R element in the composition formula is Sm.

6. The magnet according to claim 1, wherein 20 atomic percent or less of Co in the composition formula is replaced by at least one element selected from the group consisting of Ni, V, Cr, Mn, Al, Ga, Nb, Ta, and W.

7. The magnet according to claim 1, wherein 50 atomic percent or more of the M element in the composition formula is Zr.

8. A rotary electric machine comprising:
a stator; and
a rotor,
wherein the stator or the rotor includes the magnet according to claim 1.

9. The rotary electric machine according to claim 8, wherein the rotor is connected to a turbine through a shaft.

10. A vehicle comprising the rotary electric machine according to claim 8.

11. The vehicle according to claim 10,
wherein the rotor is connected to a shaft, and
wherein rotation is transmitted to the shaft.

* * * * *